US012726781B2

(12) United States Patent
Franco

(10) Patent No.: US 12,726,781 B2
(45) Date of Patent: Sep. 1, 2026

(54) HEAD TRACKING FOR THREE-DIMENSIONAL AUDIO RENDERING

(71) Applicant: Harman International Industries, Incorporated, Stamford, CT (US)

(72) Inventor: Alfredo Fernandez Franco, Sherman Oaks, CA (US)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 241 days.

(21) Appl. No.: 18/683,216

(22) PCT Filed: Aug. 11, 2022

(86) PCT No.: PCT/US2022/074850
§ 371 (c)(1),
(2) Date: Feb. 12, 2024

(87) PCT Pub. No.: WO2023/019210
PCT Pub. Date: Feb. 16, 2023

(65) Prior Publication Data

US 2024/0349003 A1 Oct. 17, 2024

Related U.S. Application Data

(60) Provisional application No. 63/260,176, filed on Aug. 11, 2021.

(51) Int. Cl.
*H04S 7/00* (2006.01)

(52) U.S. Cl.
CPC .................................... *H04S 7/303* (2013.01)

(58) Field of Classification Search
CPC ....... H04S 7/303; H04S 7/304; G06N 3/0464; G06N 3/084; G06N 20/00; H04R 5/023;
(Continued)

(56) References Cited

U.S. PATENT DOCUMENTS 10,111,002 B1 * 10/2018 Poulad .................. H04H 60/04
10,390,170 B1 * 8/2019 Karkkainen .......... G06N 20/00
(Continued)

FOREIGN PATENT DOCUMENTS

GB 2588773 A 5/2021

OTHER PUBLICATIONS

ISA European Patent Office, International Search Report and Written Opinion Issued in Application No. PCT/US2022/074850, Dec. 15, 2022, WIPO, 13 pages.

*Primary Examiner* — Gerald Gauthier
(74) *Attorney, Agent, or Firm* — McCoy Russell LLP

(57) ABSTRACT

Mechanisms and methods are provided for improved head tracking for three-dimensional audio rendering. In some embodiments, methods may comprise obtaining sensor outputs from a plurality of sensors at fixed positions on a portion of a seat (e.g., a headrest of the seat). The sensor outputs may be provided to a machine learning model, which may be trained to predict parameters related to a position and/or an orientation of a head of a user of the seat based on those sensor outputs as well as corresponding position and/or orientation parameters from a motion tracking device used during training. The machine learning model may in turn provide a set of translation and quaternion parameter predictions to an audio system for improved rendering of three-dimensional audio signaling for the headrest.

20 Claims, 7 Drawing Sheets

(58) Field of Classification Search
CPC ......... G06F 3/012; G06F 3/16; G02B 27/017; G06T 7/55; G08G 5/80
See application file for complete search history.

(56) References Cited

U.S. PATENT DOCUMENTS

| | | | | |
|---|---|---|---|---|
| 2009/0219224 | A1* | 9/2009 | Elg | H04S 7/304 345/8 |
| 2014/0328505 | A1* | 11/2014 | Heinemann | G06F 3/012 381/303 |
| 2017/0295446 | A1* | 10/2017 | Thagadur Shivappa | G06F 3/16 |
| 2019/0014431 | A1* | 1/2019 | Lee | H04S 7/303 |
| 2019/0357000 | A1* | 11/2019 | Karkkainen | G06N 20/00 |
| 2021/0006924 | A1* | 1/2021 | Terentiv | H04S 7/303 |
| 2021/0029486 | A1* | 1/2021 | Huang | H04S 7/303 |
| 2021/0055545 | A1* | 2/2021 | Rodgers | G06N 3/0455 |
| 2021/0243546 | A1* | 8/2021 | Audfray | G02B 27/017 |
| 2021/0321212 | A1* | 10/2021 | Li | H04S 7/304 |
| 2021/0397248 | A1* | 12/2021 | Landemaine | G06T 7/55 |
| 2022/0021999 | A1* | 1/2022 | Yamkovoy | G08G 5/80 |
| 2022/0404905 | A1* | 12/2022 | Haelvoet | H04S 7/303 |
| 2024/0349003 | A1* | 10/2024 | Franco | G06N 3/084 |

* cited by examiner

100

700

600

800

HEAD TRACKING FOR THREE-DIMENSIONAL AUDIO RENDERING

CROSS-REFERENCE TO RELATED APPLICATIONS

The present application claims priority to International Application No. PCT/US2022/074850, entitled "IMPROVED HEAD TRACKING FOR THREE-DIMENSIONAL AUDIO RENDERING," and filed on Aug. 11, 2022. International Application No. PCT/US2022/074850 claims priority to U.S. Provisional Application No. 63/260,176, entitled "IMPROVED HEAD TRACKING FOR THREE-DIMENSIONAL AUDIO RENDERING," and filed on Aug. 11, 2021. The entire contents of the above-listed applications are hereby incorporated by reference for all purposes.

FIELD

The disclosure relates to rendering three-dimensional audio for seated users.

BACKGROUND

Human physiology is such that the size and shape of a person's ears and its structures (and even such factors as the size and shape of a person's nasal cavities, oral cavities, and head in general) may transform sounds arising in an environment before those sounds reach the physiological structures that transduce sound vibrations into electrical activity carried by nerves (e.g., hair cells). The result is that the three-dimensional orientation of a person's head within an environment may impact sounds as one's brain perceives them. Over the course of growth and development, in perceiving incident sounds that have been physiologically transformed in this way, a person's brain learns to determine a relative direction from which the incident sounds are originating. People can thereby perceive directions from which incident sounds originate in an environment.

With knowledge of this phenomenon, audio signals can be transformed (e.g., by being pre-processed), and sounds based on those audio signals may be generated, such that the transformation of the audio signal controls the direction from which a person perceives the sounds as originating. Such a process may be referred to as audio rendering, or three-dimensional audio rendering. Audio rendering processes may establish and maintain illusory perceptions regarding the directions of origination of various sounds within the environment, even though the sounds may be emanating from speakers having fixed positions within the environment. Any of a variety of applications may be enhanced by audio rendering processes, including the establishment of a virtual presence in a real environment (e.g., to enable remote attendance of a real event) and the establishment of a virtual environment (e.g., in an entertainment context).

Audio rendering processes may benefit from being able to account for various parameters having to do with a position and/or an orientation of a person's head within an environment (and thus relative to speakers within the environment, which may have relatively fixed locations). However, conventional approaches used to gather such information, such as video-based or camera-based head tracking, may be relatively expensive. Moreover, such approaches may also have high latencies that can impact the performance of three-dimensional audio rendering systems.

SUMMARY

Disclosed herein are various mechanisms and methods for improving head tracking for three-dimensional audio rendering. For environments in which a user may be seated for lengthy portions of an audio performance, a plurality of sensors may be distributed at predetermined locations and/or orientations with respect to a seat, or with respect to a portion of a seat (such as a headrest). These sensors may be relatively inexpensive sensors. Meanwhile, the outputs of those sensors may be supplied to a machine learning model, which may incorporate a neural network (such as a convolutional neural network) or other machine learning structure.

During a training period, the model may take as inputs the outputs of the sensors as well as outputs of a motion tracking device mounted on a user seated in the seat (e.g., mounted on the user's head). The motion tracking device may be a type of device which may be prohibitively expensive and/or slow to use in standard operation. The motion tracking device may output various parameters related to a position and/or an orientation of the user's head. The position and/or orientation parameters may be expressed with respect to a broader environment (e.g., an environment containing the seat), or with respect to a portion of the seat (e.g., a headrest of the seat), or both. Over the course of training, the model may develop and improve a capacity to predict the position and/or orientation parameters as put out by the motion tracking device, based on the outputs of the sensors distributed in the environment (e.g., at the headrest of the seat).

After training, during standard operation, the model may take as inputs the outputs of the sensors without input from the motion tracking device. The model may then supply as outputs its predictions regarding position and/or orientation parameters of the user's head, based on the sensor outputs. These predicted parameters may accordingly be obtained at less expense and be performed at relatively low latencies (having dispensed with the motion tracking device). Accordingly, the mechanisms and methods disclosed herein may advantageously both decrease the expense and increase the speed of supplying position and/or orientation information to audio rendering systems, which may in turn advantageously improve fine-tuned adjustments to immersive audio experiences supported by those audio rendering systems.

In various embodiments, the expense and latency disadvantages incurred by the use of motion-tracking devices may be addressed by methods comprising the obtaining of a plurality of sensor outputs from a respectively corresponding plurality of sensors at fixed positions on a seat. The plurality of sensor outputs may be provided as inputs to a machine learning model, and a set of parameters related to the position and/or orientation of the head of a user of the seat (e.g., translation and quaternion parameters), relative to a predetermined position of the seat (e.g., a point on a headrest of the seat), may be received from the machine learning model. The machine learning model may then provide the parameters to a device for generating three-dimensional audio signaling for a user of the seat. In this way, the expense of a motion tracking device in fine-tuning an immersive audio experience may be avoided, while improving system performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
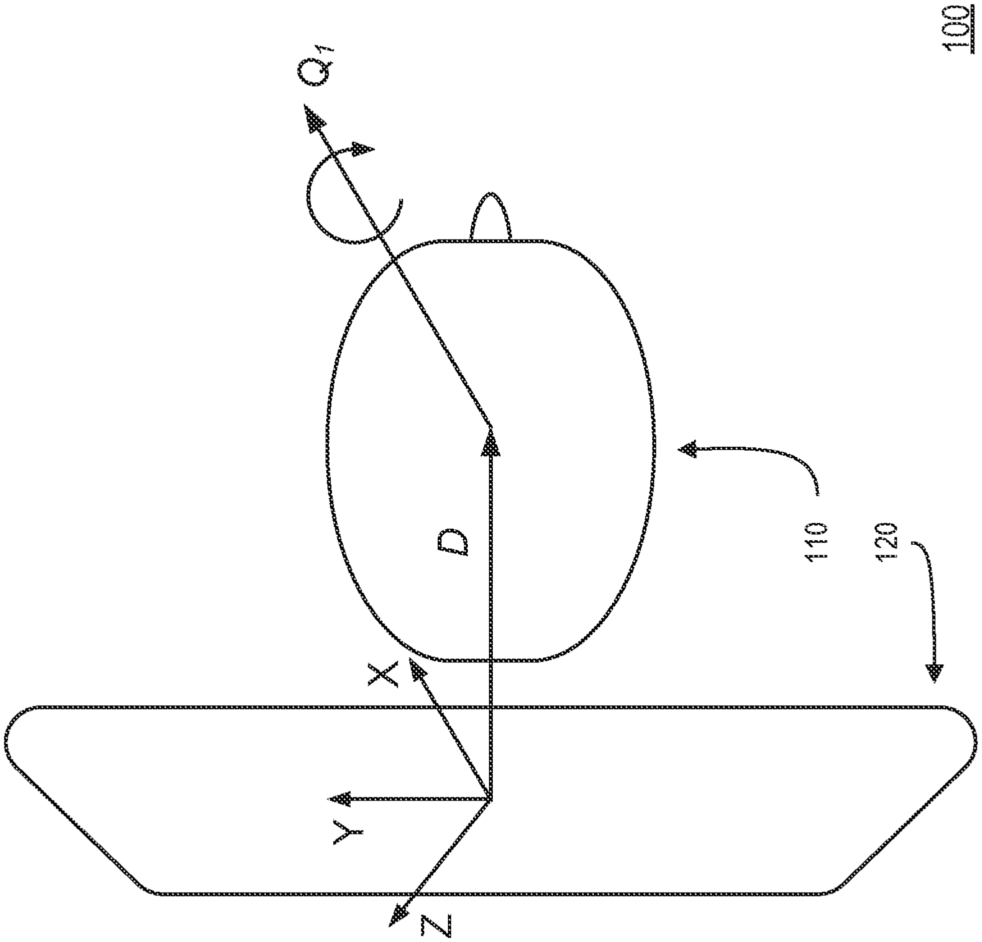
FIG. 1 shows a top schematic view of a head of a user of a seat and a headrest of the seat, in accordance with one or more embodiments of the present disclosure.
Figure 2:
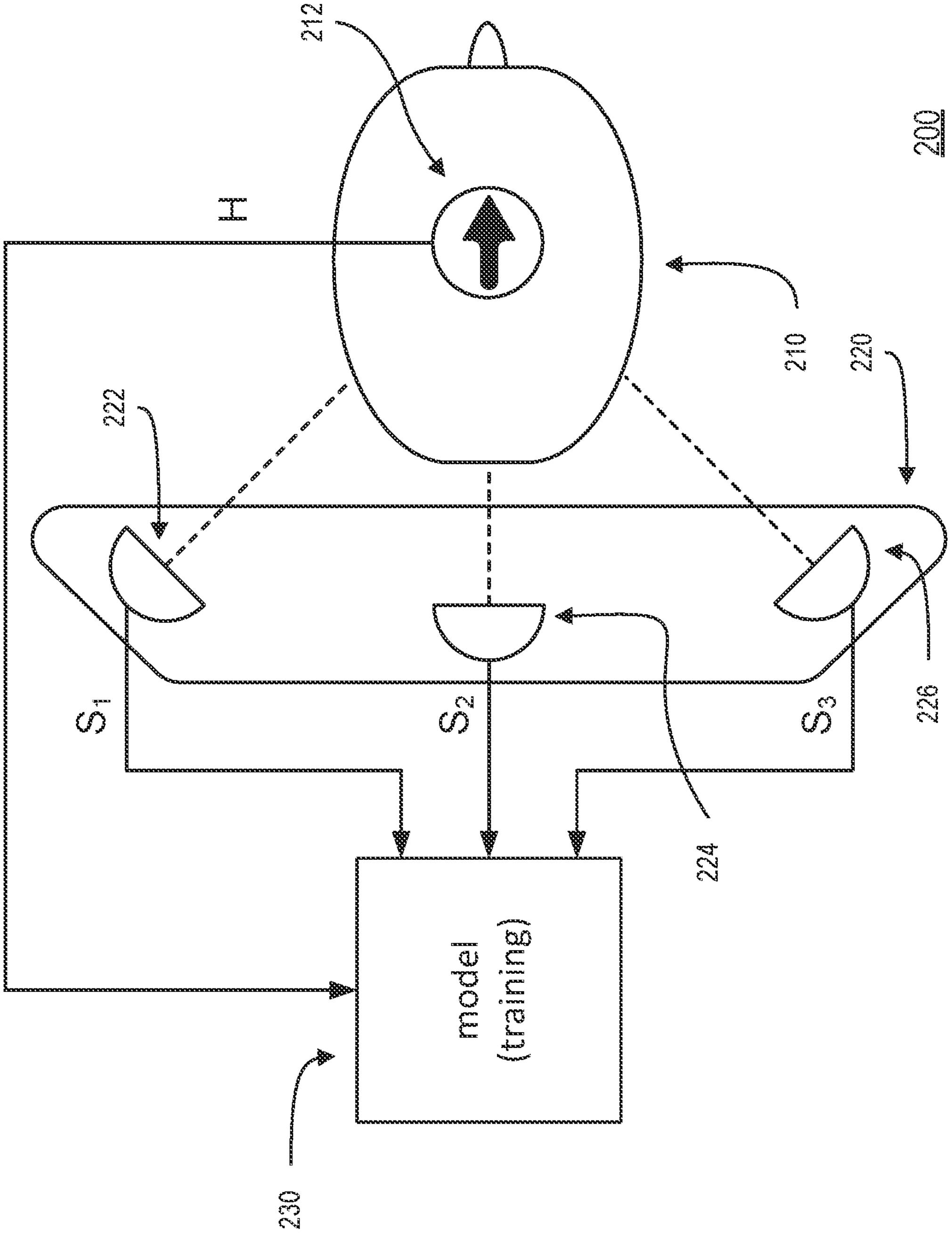
FIG. 2 shows a top schematic view of a head, a headrest, and a machine learning model during a training period, in accordance with one or more embodiments of the present disclosure.
Figure 3:
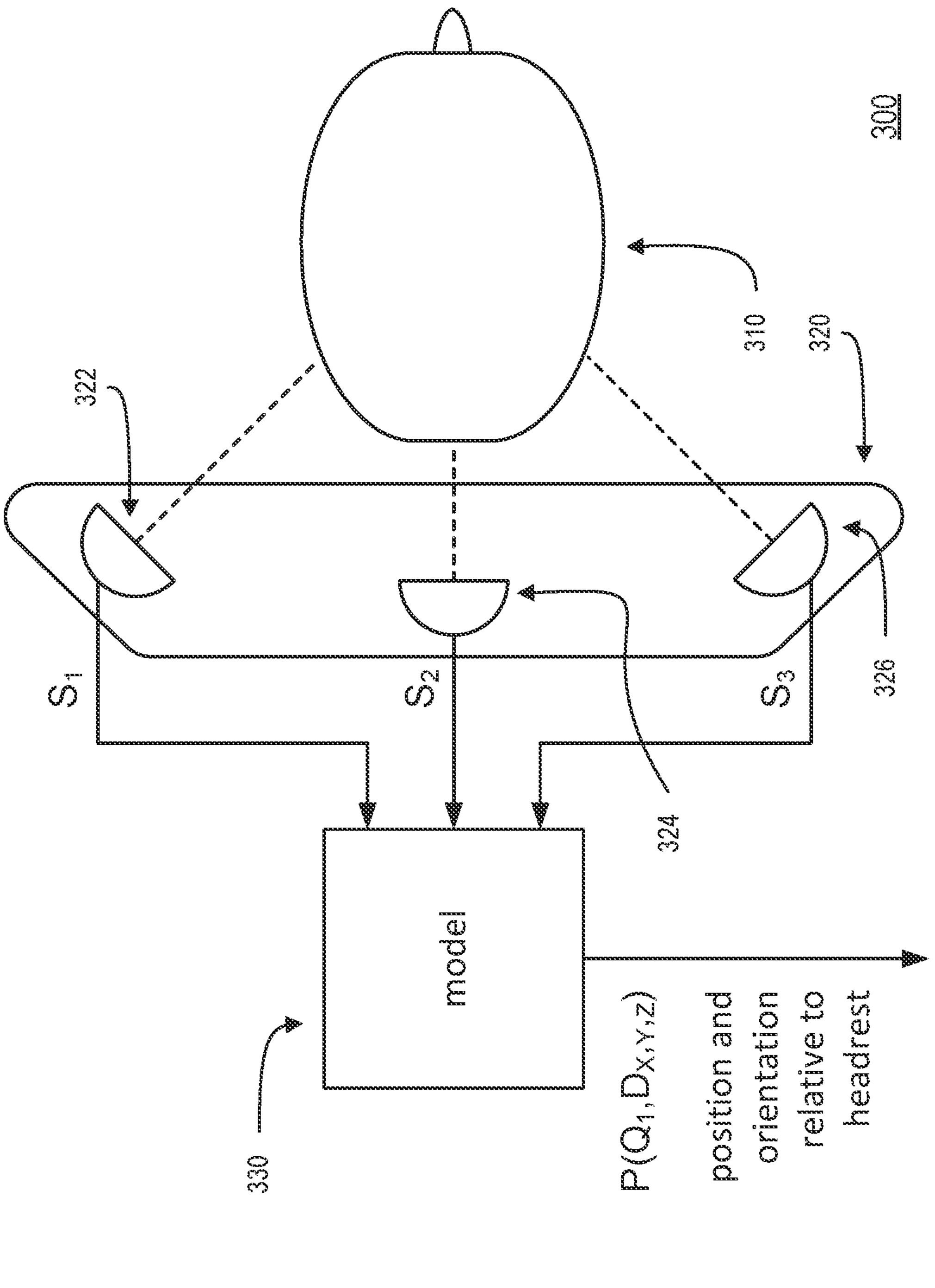
FIG. 3 shows a top schematic view of a head, a headrest, and a machine learning model during standard operation, in accordance with one or more embodiments of the present disclosure.
Figure 4:
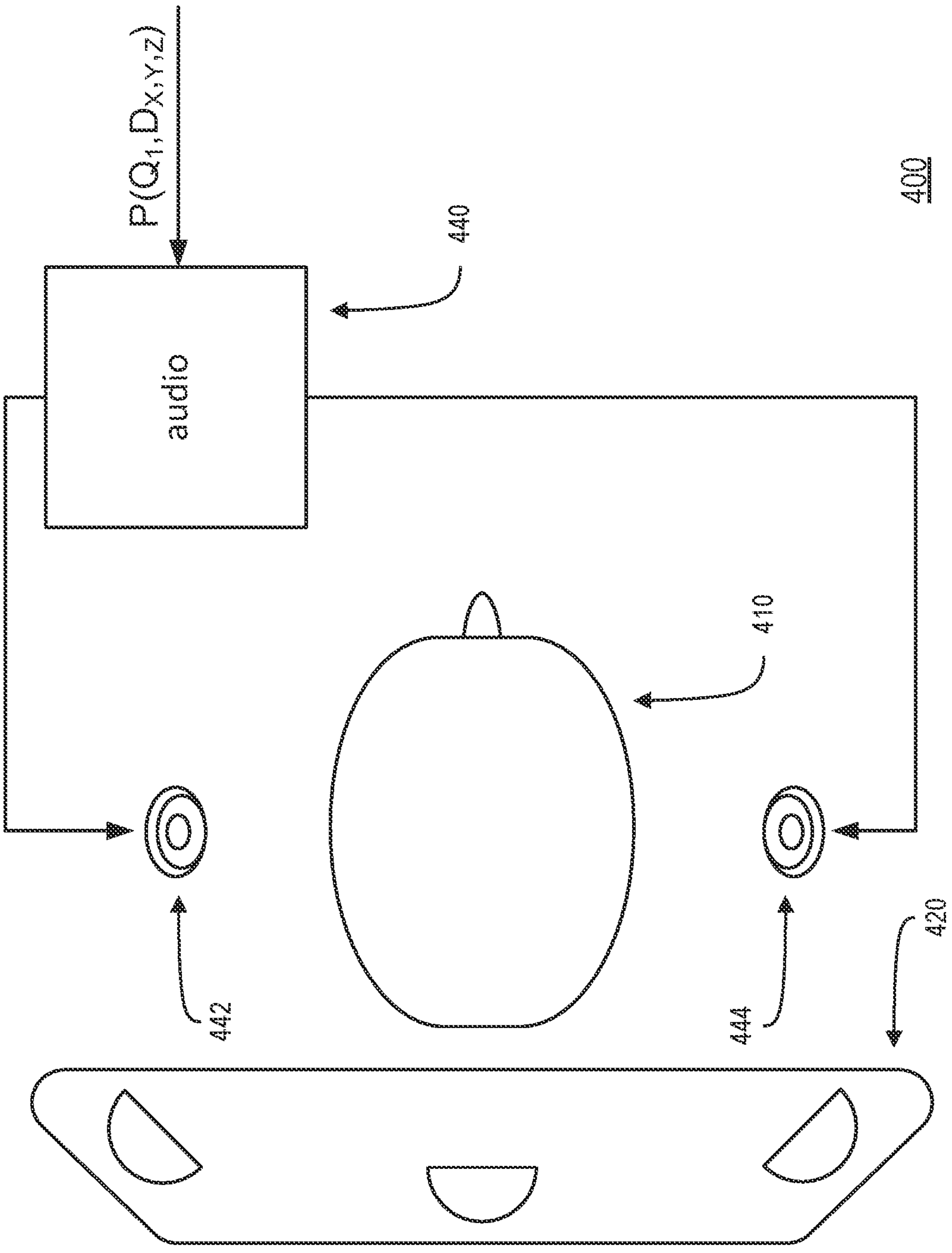
FIG. 4 shows a top schematic view of a head, a headrest, and portions of an audio system during standard operation, in accordance with one or more embodiments of the present disclosure.
Figure 5:
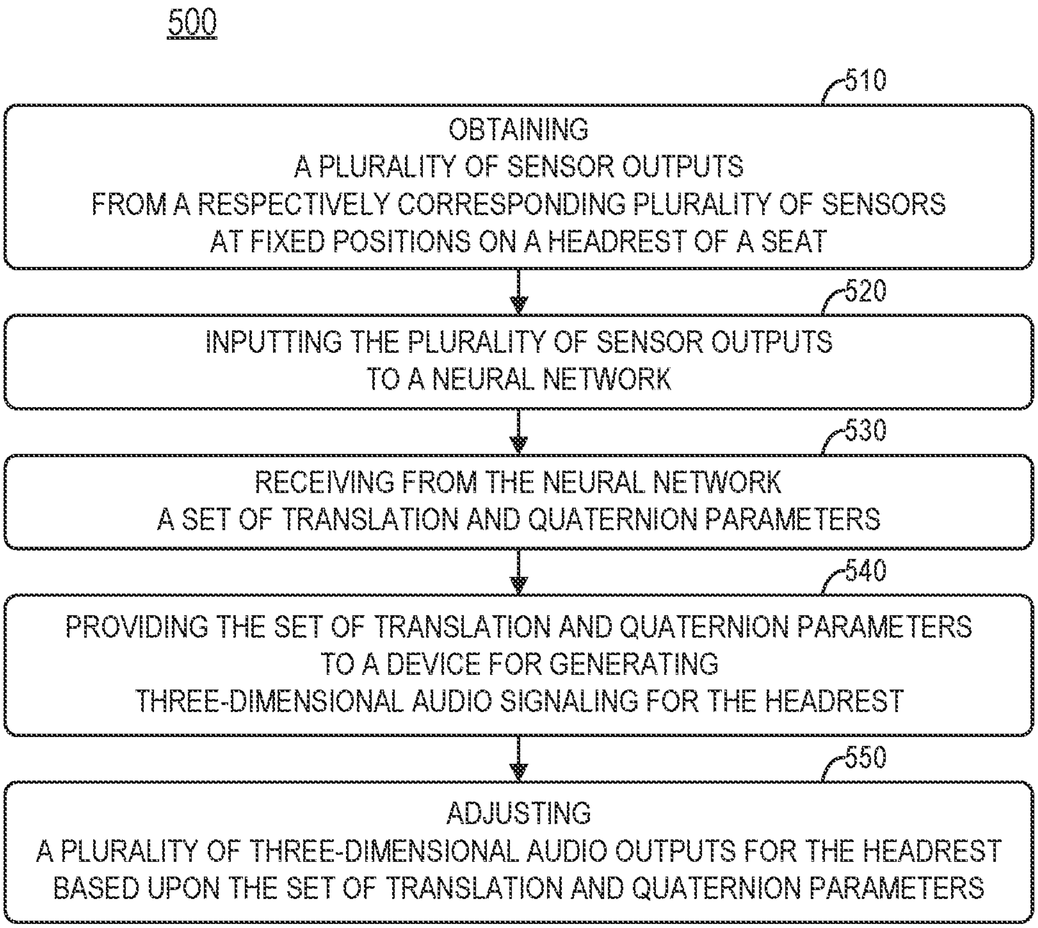
FIG. 5 shows a method for improving head tracking for three-dimensional audio rendering, in accordance with one or more embodiments of the present disclosure.

Disclosed herein are systems and methods for improving three-dimensional audio rendering. FIG. 1 shows a head of a user of a set and a headrest of the seat. FIG. 2 shows the head, the headrest, and devices positioned at the head and headrest for providing data to train a machine learning model, and FIG. 3 shows a machine learning model using a subset of such data (e.g., from a headrest) to predict position and orientation parameters of the head. FIG. 4 shows the head, the headrest, and an audio system for rendering three-dimensional audio signals based at least on the predicted position and orientation parameters. FIG. 5 shows a method for improving three-dimensional audio rendering in accordance with the disclosures of FIGS. 1-4.

FIG. 1 shows a top schematic view 100 of a head 110 of a user of a seat and a headrest 120 of the seat. The user and the seat may be located within an environment for which an audio system is supplying sound, for example through speakers at predetermined locations within the environment.

Head 110 may be relatively stationary, or may move from time to time, or may be in relatively constant motion, and head 110 may transition between these activity levels at arbitrary times. A position and/or an orientation of head 110, either within the environment or relative to headrest 120 (and/or its corresponding seat), may accordingly change over time. For example, head 110 may move such that a distance from (or between) a point on headrest 120 and a point on head 110 may change over time. Similarly, head 110 may move such that a rotation of head 110 (e.g., with respect to three-dimensional coordinates of the headrest, the seat, and/or the environment) may change over time. As a result, an audio system performing a three-dimensional audio rendering process for the purposes of supplying an immersive audio experience to the user of the seat can advantageously use information regarding the position and/or orientation of head 110 to fine-tune and otherwise improve its audio rendering.

FIG. 2 shows a top schematic view 200 of a head 210, a headrest 220, and a machine learning model 230 during a training period. Head 210 and headrest 220 may be substantially similar to head 110 and headrest 120.

A motion tracking device 212 is mounted on head 210. In various embodiments, motion tracking device 212 may be operable to engage in various types of head tracking, such as video-based and/or camera-based head-tracking. Motion tracking device 212 may have one or more outputs H for conveying various parameters related to a position and/or orientation of head 210. In various embodiments, outputs H of motion tracking device 212 may comprise a set of one or more translation parameters and/or a set of one or more quaternion parameters. In some embodiments, outputs H may comprise at least three translation parameters. For some embodiments, outputs H may comprise at least four quaternion parameters.

Meanwhile, a first sensor 222, a second sensor 224, and a third sensor 226 are mounted on headrest 220 at fixed and/or otherwise predetermined positions. First sensor 222 may have one or more outputs $S_1$, second sensor 224 may have one or more outputs $S_2$, and third sensor 226 may have one or more outputs $S_3$. In some embodiments, sensor outputs $S_1$, $S_2$, and/or $S_3$ may convey distances between head 210 and the respectively corresponding sensors.

Outputs H of motion tracking device 212 and outputs $S_1$, $S_2$, and/or $S_3$ first sensor 222, second sensor 224, and third sensor 226 may be provided to a machine learning model 130. Machine learning model 130 may engage in a training process in which it accepts a very large set of input data captured from its inputs and iteratively refines a capacity to predict values of outputs H of based on values of outputs $S_1$, $S_2$, and/or $S_3$.

Once machine learning model 130 has been trained (e.g., to predict values of outputs H) to a desirable extent or degree, the training period may end, and standard operation may begin.

FIG. 3 shows a top schematic view 300 of a head 310, a headrest 320, and a machine learning model 330 during standard operation. Head 310 and headrest 320 may be substantially similar to head 110 and headrest 120, and machine learning model 330 may be substantially similar to machine learning model 230.

A first sensor 322, a second sensor 324, and a third sensor 326 are mounted on headrest 320 at fixed and/or otherwise predetermined positions. However, there is no motion tracking device mounted on head 310. Instead, machine learning model 330 may accept, as inputs, sensor outputs $S_1$, $S_2$, and/or $S_3$, and may generate, as outputs, predicted position parameters and/or orientation parameters P $(Q_1,D_{X,Y,Z})$ based on the sensor outputs. In various embodiments, outputs P $(Q_1,D_{X,Y,Z})$ may comprise at least three translation parameters, and/or may comprise at least four quaternion parameters.

With reference to FIGS. 2 and 3, the machine learning models disclosed herein may be operable to train against outputs H of a motion tracking device and/or outputs $S_1$ through SN of a plurality of sensors. In some embodiments, there may be at least two sensors, while in other embodiments there may be at least four sensors. The sets of data used to train the model may comprise a single sampling of outputs taken at a single time, or may comprise a plurality of samples of outputs taken at a respectively corresponding plurality of times.

In various embodiments, a plurality of sensors providing outputs S/through SN may comprise capacitive sensors, very high frequency audio sensors, laser-range sensors, infrared sensors, and/or sub-millimeter-wavelength RADAR sensors. For various embodiments, the plurality of sensors may comprise at least one sensor positioned at a back-of-head position of the headrest, and at least one sensor positioned at a side-of-head position of the headrest.

In some embodiments, the machine learning models disclosed herein may have an input sampling period and/or an output prediction period of less than or equal to 10 milliseconds. For some embodiments, the input sampling period and/or output prediction period may be less than or equal to 5 milliseconds. For various embodiments, the input sampling period and/or output prediction period may be sufficient to generate at least 100 parameter predictions per second, or at least 150 parameter predictions per second, or at least 200 parameter predictions per second. The parameter predictions may accordingly be provided at an advantageously high rate (in comparison with camera-based and/or video-based head tracking, which might obtain data at a video refresh rate, e.g., 30 Hertz or 60 Hertz). Such relatively high rates may in turn advantageously accommodate a rate of positioning and orientation updates that is sufficiently high to support more pleasurable three-dimensionally rendered audio.

FIG. 4 shows a top schematic view 400 of a head 410, a headrest 420, and portions of an audio system 440 during standard operation. Head 410 and headrest 420 may be substantially similar to head 110 and headrest 120.

Audio system 440 may comprise a first audio output device 442 (e.g., a first speaker) and a second audio output device 444 (e.g., a second speaker). Audio system 440 may accept, as input, various position parameters and/or orientation parameters $P(Q_1,D_{X,Y,Z})$. Audio system 440 may use the position parameters and/or orientation parameters $P(Q_1, D_{X,Y,Z})$ in fine-tuning three-dimensional audio signaling that it provides to first audio output device 442 and/or second audio output device 444.

In various embodiments, a machine learning model (such as machine learning model 230) may provide position parameters and/or orientation parameters $P(Q_1,D_{X,Y,Z})$ related to head 410 to audio system 440. From there, audio system 440 may render three-dimensional audio outputs for first audio output device 442 and/or second audio output device 444, taking the position parameters and/or orientation parameters $P(Q_1,D_{X,Y,Z})$ into account.

Since $P(Q_1,D_{X,Y,Z})$ may include sets of predicted translation parameters and quaternion parameters from a machine learning model as disclosed herein, $P(Q_1,D_{X,Y,Z})$ may advantageously facilitate audio system 440 in providing a fine-tuned audio rendering to head 410, taking into account the position and/or orientation of head 410 relative to headrest 420. For reasons disclosed further herein, the fine-tuned audio rendering may be provided at a higher quality, and/or done at lesser expense, than similar fine-tuned audio rendering using other approaches (e.g., video-based and/or camera-based approaches).

FIG. 5 shows a method 500 for improving head tracking for three-dimensional audio rendering, with reference to the structures disclosed in FIGS. 1-4. Method 500 comprises a first part 510, a second part 520, a third part 530, a fourth part 540, and/or a fifth part 550.

In first part 510, a plurality of sensor may obtain outputs from a respectively corresponding plurality of sensors at fixed positions on a headrest of a seat (such as headrest 120). In second part 520, the plurality of sensor may be provided as inputs to a machine learning model (such as machine learning model 230). In third part 530, a set of translation and quaternion parameter predictions may be received from the machine learning model, and in fourth part 540, the predictions may be provided to a device for rendering three-dimensional audio signaling for the headrest (such as audio system 440).

In some embodiments, in fifth part 550, a plurality of three-dimensional audio outputs may be rendered for the headrest based at least in part upon the set of translation and quaternion parameter predictions. In some embodiments, the plurality of sensors may provide a plurality of outputs across a plurality of times in a time series. In some embodiments, a sampling period of the time series may be less than or equal to 10 milliseconds. In some embodiments, a sampling period of the time series may be less than or equal to 5 milliseconds.

For some embodiments, the plurality of sensor outputs may include distances between the respectively corresponding sensors and a head of a user of the seat. For some embodiments, the features for training the machine learning model may include one or more head-mounted motion sensor outputs. In some embodiments, the features for training the machine learning model may include outputs of the plurality of sensors at a plurality of times.

For some embodiments, the set of translation and quaternion parameter predictions includes at least three translation parameter predictions and at least four quaternion parameter predictions. In some embodiments, the plurality of sensors comprises sensors may comprise capacitive sensors, very high frequency audio sensors, laser-range sensors, infrared sensors, and/or sub-millimeter-wavelength RADAR sensors. For some embodiments, the plurality of sensors may comprise at least two sensors.

In some embodiments, the plurality of sensors comprises at least four sensors. For some embodiments, the plurality of sensors may comprise at least one sensor at a back-of-head position of the headrest, and at least one sensor at a side-of-head position of the headrest.

Figure 6:
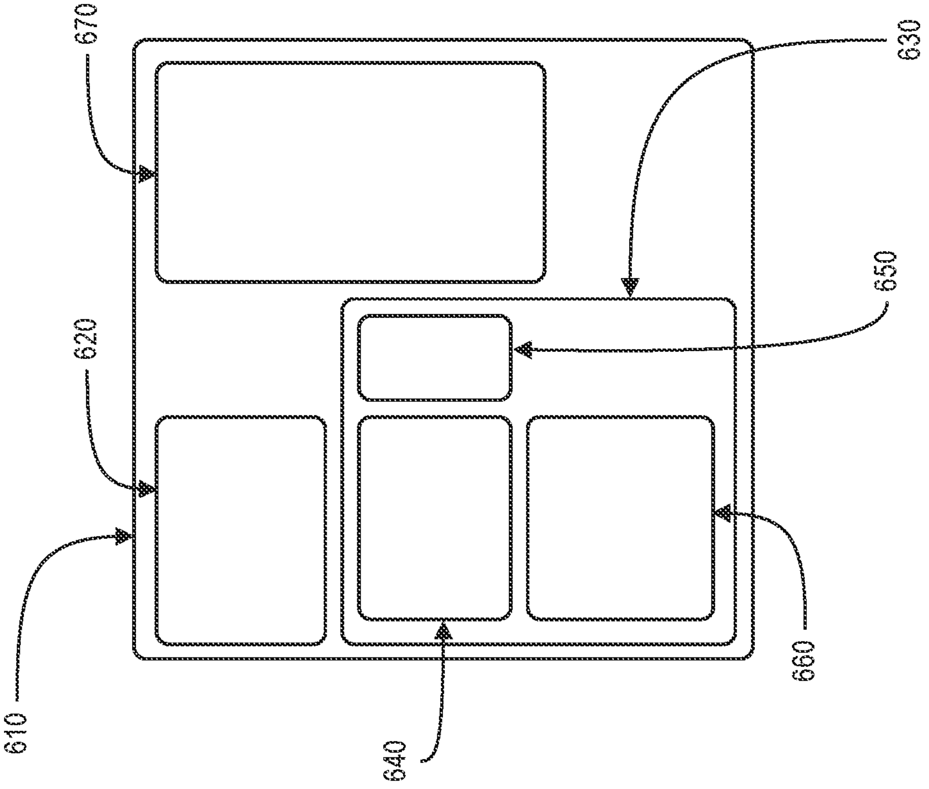
FIG. 6 shows a system for improving head tracking for three-dimensional audio rendering, in accordance with one or more embodiments of the present disclosure.

In various embodiments, machine learning models and/or audio systems as disclosed herein may comprise one or more processors and a memory having executable instructions that, when executed, cause the one or more processors to perform operations related to various parts of the methods disclosed herein. Accordingly, instructions for carrying out method 500 may be executed by one or more processors instructions stored on a memory of the processors, and in conjunction with signals received from, e.g., sensor outputs FIG. 6 shows a system 600 for improving head tracking for three-dimensional audio rendering. System 600 may comprise a case 610, a power source 620, an interconnection board 630, one or more processors 640, one or more non-transitory memories 650, one or more input/output (I/O) interfaces 660, and/or one or more media drives 670.

Memories 650 may have executable instructions stored therein that, when executed, cause processors 640 to perform various operations, as disclosed herein. I/O interfaces 660 may include, for example, one or more interfaces for wired connections (e.g., Ethernet connections) and/or one or more interfaces for wireless connections (e.g., Wi-Fi and/or cellular connections).

System 600 (and/or other systems and devices disclosed herein) may be configured in accordance with the systems discussed herein. For example, system 600 may be employed in a scenario substantially similar to scenarios depicted in view 200, view 300, and/or view 400, and/or may undertake a method substantially similar to method 500. Thus, the same advantages that apply to the views and methods discussed herein may apply to system 600.

Figure 7:
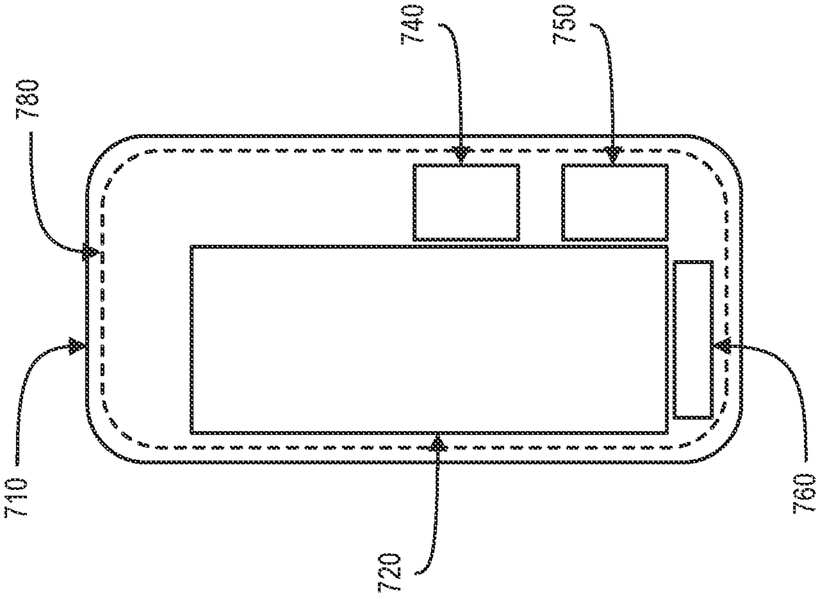
FIG. 7 shows a system for improving head tracking for three-dimensional audio rendering, in accordance with one or more embodiments of the present disclosure.

FIG. 7 shows a system 700 for improving head tracking for three-dimensional audio rendering. System 700 may comprise a case 710, a power source 720, one or more processors 740, one or more memories 750, one or more antennas 760, and/or a display screen 780.

Memories 750 may have executable instructions stored therein that, when executed, cause processors 740 to perform various operations, as disclosed herein.

System 700 (and/or other systems and devices disclosed herein) may be configured in accordance with the systems discussed herein. For example, system 700 may be employed in a scenario substantially similar to scenarios depicted in view 200, view 300, and/or view 400, and/or may undertake a method substantially similar to method 500. Thus, the same advantages that apply to the views and methods discussed herein may apply to system 700.

Figure 8:
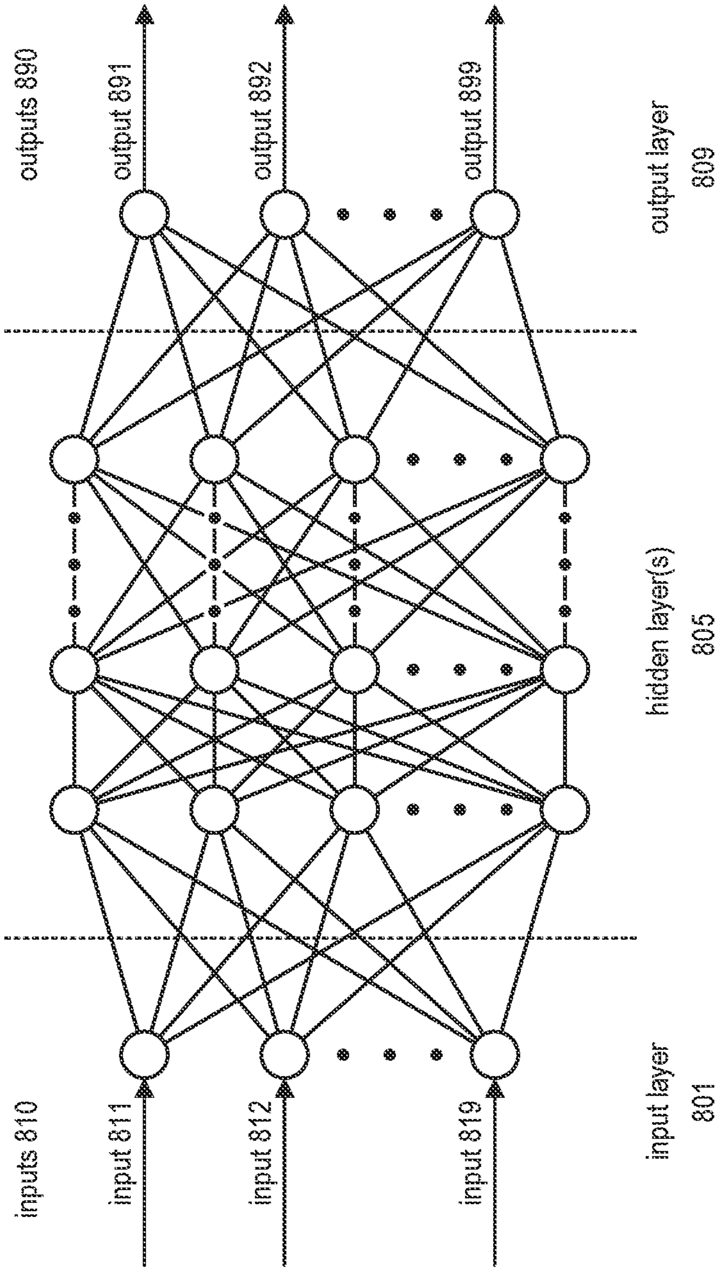
FIG. 8 shows an artificial neural network for improving head tracking for three-dimensional audio rendering, in accordance with one or more embodiments of the present disclosure.

FIG. 8 shows an artificial neural network 800 for improving head tracking for three-dimensional audio rendering. Artificial neural network 800 may generally have a machine learning architecture. In some embodiments, artificial neural network 800 may comprise a feedforward neural network, and may incorporate perceptrons, multi-layer perceptrons, and/or a radial basis network. For some embodiments, artificial neural network 800 may comprise a recurrent neural network. In some embodiments, artificial neural network 800 may incorporate one or more convolutional neural network (CNN) layers and/or may have a deep learning architecture, e.g., incorporating a deep neural network (DNN).

In some embodiments, artificial neural network 800 may be implemented primarily in circuitry, or hardware, while in other embodiments, artificial neural network 800 may be implemented primarily by a system for improving head tracking for three-dimensional audio rendering such as system 600 of FIG. 6 or system 700 of FIG. 7. In various embodiments, artificial neural network 800 may be partially implemented in circuitry, and partially implemented by a system such as system 600 of FIG. 6 or system 700 of FIG. 7. Some embodiments of artificial neural network 800 may be incorporate one or more AI accelerator devices. Moreover, in some embodiments, some portions of artificial neural network 800 may be implemented in system 600 (e.g., as cloud-based and/or centralized computation devices or servers), while other portions of artificial neural network 800 may be implemented in system 700 (e.g., as edge devices and/or user equipment), for example, as part of a federated learning architecture, whether centralized or decentralized, and/or as part of a distributed artificial intelligence architecture.

Artificial neural network 800 has an input layer 801, one or more hidden layers 805, and an output layer 809. Input layer 801 has a plurality of inputs 810, which may include any of a first input 811, a second input 812, and so on, up to an Nth input 819. In various embodiments, inputs 810 may include, for example, outputs of the plurality of sensors distributed at predetermined locations and/or orientations with respect to a seat, or with respect to a portion of a seat (whether single values thereof, time-series values thereof, or both), and/or outputs of the plurality of head-mounted sensors (whether single values thereof, time-series values thereof; and/or both) of FIG. 2. Output layer 809 has one or more outputs 890, which may include any of a first output 891, a second output 892, and so on, up to an Nth output 899. In various embodiments, outputs 890 may include, for example, predictions regarding position and/or orientation parameters of a user's head of FIGS. 2-4. Hidden layers 805 may be layers of the neural network (e.g., layers of mathematical manipulation), and may implement one or more layers of a deep learning architecture (e.g., CNN layers).

In some embodiments, artificial neural network 800 may have a deep learning architecture and/or an architecture in which hidden layers 805 include one or more layers (e.g., convolutional neural network layers and/or deep-learning architecture layers). Each layer may in turn comprise a plurality of nodes, each of which is accepts as inputs values provided by various nodes of the previous layer and/or various inputs 810 (e.g., in the first layer), and each node may provide a weighted function of the input values as an output (e.g., available for nodes of subsequent layers).

Therefore, for various embodiments, artificial neural network 800 may be trained to use, or may otherwise learn to use, sets of values provided via inputs 810 (e.g., features or parameters) in order predict sets of values for outputs 890.

In various embodiments, artificial neural network 800 may have an architecture that accommodates supervised-learning usage models, unsupervised-learning usage models, semi-supervised and/or weak-supervision usage models, and/or reinforcement learning usage models. In some embodiments, a supervised-learning usage model may be based upon perceptrons (e.g., multilayer perceptrons). For some embodiments, a supervised-learning usage model may be based upon Bayes classifiers (e.g., naïve Bayes classifiers), decision trees, K-nearest-neighbor algorithms, linear discriminant analysis, linear regressions, logistic regressions, similarity learning, and/or support-vector machines. In some embodiments, an unsupervised-learning usage model may be based upon any of a variety of networks, such as deep belief networks, Heimholtz machines, Hopfield networks (e.g., content addressable memories), Boltzmann machines (including restricted Boltzmann machines), sigmoid belief nets, autoencoders, and/or variational autoencoders.

For various embodiments, artificial neural network 800 may have an architecture that accommodates feature learning-employing supervised learning and/or unsupervised learning—in order to transform input information (e.g., information provided to artificial neural network 800 at input layer 801). For some embodiments, feature learning may be implemented as a pre-processing step (e.g., transforming inputs provided at input layer 801, then providing the transformed inputs to hidden layers 805).

In some embodiments, artificial neural network 800 may comprise a plurality of sub-networks (which may themselves be similar to artificial neural network 800 as discussed herein). The sub-networks may have substantially similar or even identical internal architectures, or may have substantially different internal architectures, and each may process a set of inputs selected from inputs 810 and/or outputs of one or more other sub-networks of artificial neural network 800. Artificial neural network 800 may accordingly incorporate an iterative or recursive structure among sub-networks, and/or incorporate a parallel-processing structure between sub-networks.

In some embodiments, in a training phase, artificial neural network 800 may be provided with a set of inputs including one or more of: outputs of the plurality of sensors distributed at predetermined locations and/or orientations with respect to a seat, or with respect to a portion of a seat (whether single values thereof, time-series values thereof, or both), and/or outputs of the plurality of head-mounted sensors (whether single values thereof, time-series values thereof; and/or both) of FIG. 2. The set of inputs may be provided along with a label or other indicator of whether or not the set of inputs satisfies a criteria that artificial neural network 800 is to be trained to predict. In some embodiments, the criteria may be a parameter having one of two possible values (e.g., a "true" or "false" value, or a "1" or "0" value). For some embodiments, the criteria may itself be a parameter having any of a range of values (e.g., a range of numerical values, whether discrete or substantially continuous). Such a training phase may be employed for embodiments of artificial neural network 800 having an architecture that accommodates supervised-learning or semi-supervised learning usage models, for example. Once artificial neural network 800 has processed the set of inputs, artificial neural network 800 may be a trained artificial neural network, and may be applied to supply predictions, via outputs 890, as to whether a subsequent set of inputs satisfies the criteria that it has been trained to predict.

In some embodiments, an error back-propagated through convolutional and/or deconvolutional filters of artificial neural network 800, resulting in adjustments to various weights of hidden layers 805 of artificial neural network 800, in order to increase an accuracy of artificial neural network 800 until the error converges. For some embodiments, a back-propagation of the loss may occur according to a gradient descent algorithm, or according to another method of back-propagation. In some embodiments, sets of values may be presented to inputs 810 in order to train artificial neural network 800 until a rate of change (of, e.g., the weights of hidden layers 805) is less than a threshold value.

Artificial neural network 800 may accordingly be utilized implement machine learning algorithms that utilize multiple layers of non-linear processing units for feature extraction and transformation of data received by the inputs (instantaneously and historically), where each layer uses output from at least one other (e.g., prior) layer. The machine learning algorithms may perform pattern analysis, event and/or data classification, object/image and/or speech recognition, natural language processing, and/or other processing using artificial neural networks/deep neural nets, propositional formulas, credit assignment paths (e.g., chains of transformations from input to output to describe causal connections between input and output), generative models (e.g., nodes in Deep Belief Networks and Deep Boltzmann Machines). In various embodiments, artificial neural network 800 may further comprise one or more densely connected layers, one or more pooling layers, one or more up sampling layers, one or more ReLU layers, and/or any other layers conventional in the art of machine learning.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the machine learning models and audio systems described above with respect to FIGS. 1-4. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: obtaining a plurality of sensor outputs from a plurality of sensors at fixed positions on a headrest of a seat, inputting the plurality of sensor outputs to a machine learning model, receiving, from the machine learning model, a set of translation and quaternion parameter predictions, and providing the set of translation and quaternion parameter predictions to a device for rendering three-dimensional audio signaling for the headrest. In a first example of the method, the method further comprises: rendering a plurality of three-dimensional audio outputs for the headrest based at least in part upon the set of translation and quaternion parameter predictions. In a second example of the method, optionally including the first example, the plurality of sensor outputs includes distances between the plurality of sensors and a head of a user of the seat. In a third example of the method, optionally including one or both of the first and second examples, a set of features for training the machine learning model includes outputs of the plurality of sensors at a plurality of times. In a fourth example of the method, optionally including one or more or each of the first through third examples, a set of features for training the machine learning model includes one or more head-mounted motion sensor outputs. In a fifth example of the method, optionally including one or more or each of the first through fourth examples, the plurality of sensors provides a plurality of outputs across a plurality of times in a time series. In a sixth example of the method, optionally including one or more or each of the first through fifth examples, a sampling period of the time series is less than or equal to 10 milliseconds. In a seventh example of the method, optionally including one or more or each of the first through sixth examples, the set of translation and quaternion parameter predictions includes at least three translation parameter predictions and at least four quaternion parameter predictions. In an eighth example of the method, optionally including one or more or each of the first through seventh examples, the plurality of sensors comprises sensors selected from a group consisting of: capacitive sensors, very high frequency audio sensors, laser-range sensors, infrared sensors, and sub-millimeter-wavelength RADAR sensors. In a ninth example of the method, optionally including one or more or each of the first through eighth examples, the plurality of sensors comprises at least two sensors. In a tenth example of the method, optionally including one or more or each of the first through ninth examples, the plurality of sensors comprises at least four sensors. In an eleventh example of the method, optionally including one or more or each of the first through tenth examples, the plurality of sensors comprises at least one sensor at a back-of-head position of the headrest, and at least one sensor at a side-of-head position of the headrest.

The disclosure also provides support for a method for tracking of a head within an environment, comprising:

obtaining, from a plurality of sensors at fixed positions in the environment, a plurality of sensor outputs, the plurality of sensors measuring distances to the head, inputting the plurality of sensor outputs to a machine learning model trained, the machine learning model being trained using a set of features including the plurality of sensor outputs and one or more head-mounted motion-sensor outputs, receiving, from the machine learning model, a set of translation and quaternion parameter predictions for rendering one or more three-dimensional audio outputs, and providing the set of translation and quaternion parameter predictions to a device for rendering three-dimensional audio signaling. In a first example of the method, the method further comprises: rendering a plurality of three-dimensional audio outputs for a headrest based at least in part upon the set of translation and quaternion parameter predictions. In a second example of the method, optionally including the first example, the set of features includes outputs of the plurality of sensors at a plurality of times. In a third example of the method, optionally including one or both of the first and second examples, the plurality of sensors comprises at least four sensors selected from a group consisting of: capacitive sensors, very high frequency audio sensors, laser-range sensors, infrared sensors, and sub-millimeter-wavelength RADAR sensors, wherein a sampling period of the plurality of sensors is less than or equal to 10 milliseconds, and wherein the set of translation and quaternion parameter predictions includes at least three translation parameter predictions and at least four quaternion parameter predictions.

The disclosure also provides support for a system for tracking of a head with respect to a headrest of a seat, comprising: a plurality of sensors at fixed positions on the headrest, one or more processors, and a non-transitory memory having executable instructions that, when executed, cause the one or more processors to: obtain, from the plurality of sensors, a plurality of sensor outputs, input the plurality of sensor outputs to a machine learning model, receive, from the machine learning model, a set of translation and quaternion parameter predictions, provide the set of translation and quaternion parameter predictions to a device for rendering three-dimensional audio signaling for the headrest, and render a plurality of three-dimensional audio outputs for the headrest based at least in part upon the set of translation and quaternion parameter predictions. In a first example of the system, the plurality of sensors comprises sensors selected from a group consisting of: capacitive sensors, very high frequency audio sensors, laser-range sensors, infrared sensors, and sub-millimeter-wavelength RADAR sensors, and wherein the plurality of sensors comprises at least one sensor at a back-of-head position of the headrest, and at least one sensor at a side-of-head position of the headrest. In a second example of the system, optionally including the first example, the plurality of sensors provides a plurality of outputs across a plurality of times in a time series, and wherein a sampling period of the time series is less than or equal to 10 milliseconds. In a third example of the system, optionally including one or both of the first and second examples, the plurality of sensor outputs includes distances between the plurality of sensors and the head, wherein a set of features for training the machine learning model include outputs of the plurality of sensors at a plurality of times, wherein the set of features for training the machine learning model include one or more head-mounted motion sensor outputs, and wherein the set of translation and quaternion parameter predictions includes at least three translation parameter predictions and at least four quaternion parameter predictions.

As used herein, the terms "substantially the same as" or "substantially similar to" are construed to mean the same as with a tolerance for variation that a person of ordinary skill in the art would recognize as being reasonable.

As used herein, terms such as "first," "second," "third," and so on are used merely as labels, and are not intended to impose any numerical requirements, any particular positional order, or any sort of implied significance on their objects.

As used herein, terms such as "first," "second," "third," and so on are used merely as labels, and are not intended to impose numerical requirements or a particular positional order on their objects.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments.

As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring only one such element nor excluding two or more such elements.

Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:

obtaining a plurality of sensor outputs from a plurality of sensors at fixed positions on a headrest of a seat;

inputting the plurality of sensor outputs to a machine learning model;

receiving, from the machine learning model, a set of translation and quaternion parameter predictions; and providing the set of translation and quaternion parameter predictions to a device for rendering three-dimensional audio signaling for the headrest;

wherein the machine learning model is trained using ground truth data including parameters related to a position and/or an orientation of a head of a subject acquired from a motion tracking device mounted to the head of the subject.

2. The method of claim 1, further comprising:

rendering a plurality of three-dimensional audio outputs for the headrest based at least in part upon the set of translation and quaternion parameter predictions.

3. The method of claim 1, wherein outputs of the motion tracking device comprise a set of one or more translation parameters and a set of one or more quaternion parameters.

4. The method of claim 1, wherein a set of features for training the machine learning model includes a single sampling of outputs taken at a single time.

5. The method of claim 1, wherein the machine learning model is a convolutional neural network.

6. The method of claim 1, wherein the plurality of sensors provides a plurality of outputs across a plurality of times in a time series.

7. The method of claim 6, wherein a sampling period of the time series is less than or equal to 10 milliseconds.

8. The method of claim 1, wherein the set of translation and quaternion parameter predictions includes at least three translation parameter predictions and at least four quaternion parameter predictions.

9. The method of claim 1, wherein the plurality of sensors comprises sensors selected from a group consisting of: capacitive sensors; very high frequency audio sensors; laser-range sensors; infrared sensors; and sub-millimeter-wavelength RADAR sensors.

10. The method of claim 1, wherein the plurality of sensors comprises at least two sensors.

11. The method of claim 1, wherein the plurality of sensors comprises at least four sensors.

12. The method of claim 1, wherein the plurality of sensors comprises at least one sensor at a back-of-head position of the headrest, and at least one sensor at a side-of-head position of the headrest.

13. A method for tracking of a head within an environment, comprising:

obtaining, from a plurality of sensors at fixed positions in the environment, a plurality of sensor outputs, the plurality of sensors measuring distances to the head;

inputting the plurality of sensor outputs to a machine learning model, the machine learning model being trained using a set of features including the plurality of sensor outputs as input data and one or more head-mounted motion-sensor outputs as ground truth data;

receiving, from the machine learning model, a set of translation and quaternion parameter predictions for rendering one or more three-dimensional audio outputs; and providing the set of translation and quaternion parameter predictions to a device for rendering three-dimensional audio signaling.

14. The method for tracking of the head within the environment of claim 13, further comprising:

rendering a plurality of three-dimensional audio outputs for a headrest based at least in part upon the set of translation and quaternion parameter predictions.

15. The method for tracking of the head within the environment of claim 13, wherein the set of features includes outputs of the plurality of sensors at a plurality of times.

16. The method for tracking of the head within the environment of claim 13, wherein the plurality of sensors comprises at least four sensors selected from a group consisting of: capacitive sensors; very high frequency audio sensors; laser-range sensors; infrared sensors; and sub-millimeter-wavelength RADAR sensors;

wherein a sampling period of the plurality of sensors is less than or equal to 10 milliseconds; and wherein the set of translation and quaternion parameter predictions includes at least three translation parameter predictions and at least four quaternion parameter predictions.

17. A system for tracking of a head with respect to a headrest of a seat, comprising:

a plurality of sensors at fixed positions on the headrest;

one or more processors; and a non-transitory memory having executable instructions that, when executed, cause the one or more processors to:

obtain, from the plurality of sensors, a plurality of sensor outputs;

input the plurality of sensor outputs to a machine learning model;

receive, from the machine learning model, a set of translation and quaternion parameter predictions;

provide the set of translation and quaternion parameter predictions to a device for rendering three-dimensional audio signaling for the headrest; and render a plurality of three-dimensional audio outputs for the headrest based at least in part upon the set of translation and quaternion parameter predictions;

wherein the machine learning model is trained using ground truth data including parameters related to a position and/or an orientation of a head of a subject acquired from a motion tracking device mounted to the head of the subject.

18. The system for tracking of the head with respect to the headrest of the seat of claim 17, wherein the plurality of sensors comprises sensors selected from a group consisting of: capacitive sensors; very high frequency audio sensors; laser-range sensors; infrared sensors; and sub-millimeter-wavelength RADAR sensors; and wherein the plurality of sensors comprises at least one sensor at a back-of-head position of the headrest, and at least one sensor at a side-of-head position of the headrest.

19. The system for tracking of the head with respect to the headrest of the seat of claim 17, wherein the plurality of sensors provides a plurality of outputs across a plurality of times in a time series; and wherein a sampling period of the time series is less than or equal to 10 milliseconds.

20. The system for tracking of the head with respect to the headrest of the seat of claim 17, wherein the plurality of sensor outputs includes distances between the plurality of sensors and the head;

wherein a set of features for training the machine learning model include outputs of the plurality of sensors at a plurality of times;

wherein the set of features for training the machine learning model include one or more head-mounted motion sensor outputs; and wherein the set of translation and quaternion parameter predictions includes at least three translation parameter predictions and at least four quaternion parameter predictions.

* * * * *